(12) United States Patent
Kim et al.

(10) Patent No.: US 11,792,266 B2
(45) Date of Patent: Oct. 17, 2023

(54) METHOD AND SYSTEM FOR DELIVERING A SHOULDER-TAP FOR BATTERY-CONSTRAINED CELLULAR IOT DEVICES

(71) Applicant: Aeris Communications, Inc., San Jose, CA (US)

(72) Inventors: Dae Seong Kim, Campbell, CA (US); David Hu, Sunnyvale, CA (US); Sean Jones, Swindon (GB); Steven Bedell, Prairie Village, KS (US); Stephen Dotolo, Tulsa, OK (US); Sundararaj Arunachalam, Naperville, IL (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 17/487,239

(22) Filed: Sep. 28, 2021

(65) Prior Publication Data
US 2022/0103636 A1    Mar. 31, 2022

Related U.S. Application Data

(60) Provisional application No. 63/084,763, filed on Sep. 29, 2020.

(51) Int. Cl.
*H04L 67/12* (2022.01)
*H04W 4/70* (2018.01)
(Continued)

(52) U.S. Cl.
CPC ............... *H04L 67/12* (2013.01); *H04W 4/70* (2018.02); *H04W 52/0216* (2013.01);
(Continued)

(58) Field of Classification Search
CPC .... H04L 67/12; H04W 4/70; H04W 52/0216; G16Y 40/20; G16Y 40/35; Y02D 30/70
See application file for complete search history.

(56) References Cited

U.S. PATENT DOCUMENTS

| 8,948,803 | B2 | 2/2015 | Brezee |
| 9,042,888 | B2 | 5/2015 | Juang |

(Continued)

OTHER PUBLICATIONS

"Wireless IP for IoT / M2M Best Practices, Neo White Paper", 2015, Aeris Communications, Inc., Total 8 Pages. (Year: 2015).*

(Continued)

*Primary Examiner* — Austin J Moreau
*Assistant Examiner* — Chhian (Amy) Ling
(74) *Attorney, Agent, or Firm* — Shih IP Law Group, PLLC (57) ABSTRACT

A computer-implemented method, system, and a computer program product for delivering a shoulder-tap to one or more battery-constrained devices are disclosed. The computer-implemented method includes receiving a shoulder-tap request; storing the shoulder-tap request in a database; retrieving last known network session information for the one or more battery-constrained devices; calculating shoulder-tap beacon frequency for each of the one or more battery-constrained devices; creating a shoulder-tap beacon for each of the one or more battery-constrained devices; and sending the shoulder-tap beacon to the destination IP address for each of the one or more battery-constrained devices in the calculated shoulder-tap beacon frequency.

27 Claims, 4 Drawing Sheets

(51) Int. Cl.
  *H04W 52/02* (2009.01)
  *G16Y 40/20* (2020.01)
  *G16Y 40/35* (2020.01)

(52) U.S. Cl.
  CPC .............. *G16Y 40/20* (2020.01); *G16Y 40/35* (2020.01); *Y02D 30/70* (2020.08)

(56) References Cited

U.S. PATENT DOCUMENTS

| | | | |
|---|---|---|---|
| 9,137,191 B2 | 9/2015 | Firstenberg | |
| 2011/0038264 A1* | 2/2011 | Ishii | H04W 8/04 370/238 |
| 2012/0239757 A1 | 9/2012 | Firstenberg et al. | |
| 2014/0113609 A1* | 4/2014 | Elloumi | H04W 68/00 455/418 |
| 2014/0126425 A1 | 5/2014 | Burd et al. | |
| 2016/0315998 A1* | 10/2016 | Johnson | H04W 4/40 |
| 2017/0006034 A1 | 1/2017 | Link | |
| 2017/0227965 A1 | 8/2017 | Decenzo et al. | |
| 2018/0074575 A1* | 3/2018 | Link, II | H04W 52/028 |
| 2018/0152591 A1* | 5/2018 | Sato | H04N 1/33376 |
| 2020/0125355 A1* | 4/2020 | Aust | G06F 8/65 |
| 2020/0128482 A1* | 4/2020 | Daoura | H04W 4/80 |
| 2020/0191913 A1 | 6/2020 | Zhang et al. | |
| 2020/0205060 A1* | 6/2020 | Karimli | H04W 24/10 |
| 2021/0153295 A1 | 5/2021 | Harper | |
| 2021/0256833 A1* | 8/2021 | Daoura | H04W 4/029 |

OTHER PUBLICATIONS

Aust, "Software Downloads in Trusted Zones with Wake-up Sensors for Connected Vehicles", 2018 IEEE 88th Vehicular Technology Conference (VTC-Fall), pp. 1-5. (Year: 2018).*

Fomichev et al., "Survery and Systematization of Secure Device Pairing", IEEE Communications Surveys & Tutorials, vol. 20, No. 1, First Quarter 2018, 34 pages, retrieved on Nov. 28, 2021.

International Search Report and Written Opinion from International Application No. PCT/US2021/052339 dated Jan. 11, 2022, 7 pages.

Aeris, New Feature: LTE-M IP Shoulder Tap Enables Cost-Efficient Communication with Devices in Power Saving Mode, Nov. 20, 2020, 3 pages.

* cited by examiner

METHOD AND SYSTEM FOR DELIVERING A SHOULDER-TAP FOR BATTERY-CONSTRAINED CELLULAR IOT DEVICES

CROSS-REFERENCE TO RELATED APPLICATION

Under 35 USC 119(e), this application claims priority to U.S. Provisional Application No. 63/084,763, filed Sep. 29, 2020, entitled "METHOD AND SYSTEM FOR DELIVERING A SHOULDER-TAP FOR BATTERY-CONSTRAINED CELLULAR IOT DEVICES" which is incorporated herein by reference in its entirety.

FIELD OF THE INVENTION

The present invention relates generally to IoT devices and more particularly to a method and system for delivering a shoulder-tap for battery-constrained IoT devices.

BACKGROUND

In cellular Internet of Things (IoT), many devices are battery powered and adopt various methods to conserve battery life. One of the key challenges in communicating with battery-constrained devices that utilize power saving functions is to contact the device or wake it up to trigger some action, for example, checking in to the application server. This process is what we call "shoulder-tap". In 2G/3G devices, shoulder-tap is typically done using Short Message Service (SMS), which has built-in "store and forward" service in nature. However, SMS is not always available in Long Term Evolution (LTE) and Narrow Band (NB)—IoT devices, which mostly support internet protocol (IP) based data connectivity only. The mobile nature of cellular devices, i.e. roaming across serving gateway (SGW) boundaries and even different Mobile Network Operators (MNOs) while the User Equipment (UE) (or the IoT/cellular IoT device) is in power saving state, makes it difficult to deliver shoulder-tap packet(s) to the device in a reliable and cost-efficient manner, not to mention that "extended buffering of mobile terminated (MT) data at the serving gateway (SGW)" is not always guaranteed and prone to resource constraints at the serving gateway (SGW) itself.

Accordingly, what is desired is provide a method to optimize the selection and delivery of a shoulder-tap approach in specific situations, and particularly those of delivery to battery-constrained devices to improve the feasibility, reliability and economics of establishing communications as well as prioritizing approaches for one or more preferred implementations.

As used herein the terms device, third party system, smart phone, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

SUMMARY OF THE INVENTION

A computer-implemented method, system, and a computer program product for delivering a shoulder-tap to one or more battery-constrained devices are disclosed.

In an embodiment, the computer-implemented method includes receiving a shoulder-tap request; storing the shoulder-tap request in a database; retrieving last known network session information for the one or more battery-constrained devices; calculating shoulder-tap beacon frequency for each of the one or more battery-constrained devices; creating a shoulder-tap beacon for each of the one or more battery-constrained devices; and sending the shoulder-tap beacon to the destination internet protocol (IP) address for each of the one or more battery-constrained devices in the calculated shoulder-tap beacon frequency.

In another embodiment, the system for delivering a shoulder-tap to one or more battery-constrained devices including an application server, front end application programming interface (API), a shoulder-tap server, a shoulder-tap database, a session database and one or more battery-constrained devices, wherein the shoulder-tap server receives a shoulder-tap request for one or more battery-constrained devices from an application server; stores the shoulder-tap request in the shoulder-tap database; retrieves last known network session information from the session database for each of the one or more battery-constrained devices; calculates shoulder-tap beacon frequency for each of the one or more battery-constrained devices; creates a shoulder-tap beacon for each of the one or more battery-constrained devices; and sends the shoulder-tap beacon to the destination internet protocol (IP) address for each of the one or more battery-constrained devices in the calculated shoulder-tap beacon frequency.

In yet another embodiment, the non-transitory computer-readable medium for delivering a shoulder-tap to one or more battery-constrained devices having executable instructions stored therein that, when executed, cause one or more processors corresponding to a system having a storage database, a data processing system including a processor, a database and a user interface to perform operations including receiving a shoulder-tap request for one or more battery-constrained devices; storing the shoulder-tap request in a database; retrieving last known network session information for each of the one or more battery-constrained devices for previous network session; calculating shoulder-tap beacon frequency for each of the battery-constrained devices; creating a shoulder-tap beacon for each of the one or more battery-constrained devices; and sending the shoulder-tap beacon to the destination internet protocol (IP) address for each of the one or more battery-constrained devices in the calculated shoulder-tap beacon frequency.

Further embodiments, forms, objects, features, advantages, aspects, and benefits of the present application shall become apparent from the detailed description and drawings included herein.

DETAILED DESCRIPTION

The present invention relates generally to IoT devices and more specifically to a method and system for delivering a shoulder-tap for battery-constrained IoT devices.

In cellular IoT, many devices are battery powered and adopt various methods to conserve battery life. 3GPP has introduced "high latency communication" concept to address this issue in battery-constrained devices as follows (in TS 23.401, clause 4.3.17.7): functions for high latency communication may be used to handle mobile terminated (MT) communication with user equipment(s) (UE(s)) (or the IoT/cellular IoT devices) being unreachable while using power saving functions e.g., UE power saving mode or extended idle mode discontinuous reception (DRX) depending on operator configuration. "High latency" refers to the initial response time before normal exchange of packets is established. That is, the time it takes before a UE has woken up from its power saving state and responded to the initial downlink packet(s).

The high latency communication includes invoking extended buffering of MT data at the serving gateway (SGW) when the UE is in a power saving state and not reachable.

One of the key challenges in communicating with these battery-constrained devices that utilize power saving functions is to contact the device or wake it up to trigger some action, for example, checking in to the application server. This process is what we call "shoulder-tap". In 2G/3G devices, shoulder-tap is typically done using SMS, which has built-in "store and forward" service in nature. However, SMS is not always available in Long Term Evolution (LTE) and Narrow Band (NB) IoT devices, which mostly support internet protocol (IP)-based data connectivity only. The mobile nature of cellular devices, i.e. roaming across serving gateway (SGW) boundaries and even different mobile network operators (MNOs) while the UE is in power saving state, makes it difficult to deliver shoulder-tap packet(s) to the device in a reliable and cost-efficient manner, not to mention that "extended buffering of mobile terminated (MT) data at the serving gateway (SGW)" is not always guaranteed and prone to resource constraints at the SGW itself. Moreover, although "extended buffering" scheme may be used in certain situations, optimized algorithm and implementation for supporting shoulder-tap for long term evolution for machines (LTE-M) and narrow band internet of things (NB-IoT) devices may be beneficial in certain situation.

Accordingly, what is desired is to provide a method to optimize the selection and delivery of a shoulder-tap approach in specific situations, and particularly those of delivery to battery-constrained devices to improve the feasibility, reliability and economics of establishing communications as well as prioritizing approaches for one or more preferred implementations.

Various embodiments described herein provide reliable and cost-efficient mechanism with built-in "store-and-forward" functionality. As described in the description of various embodiments below, this is achieved by sending a beacon of shoulder tap packet(s) with a unique identifier to the device continuously until the device acknowledges receipt of the shoulder tap packet(s). The frequency of the shoulder tap beacon packet(s) is dynamically calculated to factor in the operational parameters including the serving gateway (SGW) 'down link (DL) packet buffering duration time' and 'down link (DL) packet buffering suggested packet count', as well as 'listen window size between sleeps' and 'wake up duration time' of the one or more devices.

In one or more embodiment described herein, the shoulder-tap beacon frequency is dynamically calculated each time right before the shoulder-tap beacon message is sent out, using a specific algorithm. Since all the information in the shoulder-tap beacon frequency calculation should be made available at various phases of the network operation, it cannot be conducted by a human.

A computer-implemented method, system, and a computer program product for delivering a shoulder-tap to one or more battery-constrained devices are disclosed.

In an embodiment, the computer-implemented method includes receiving a shoulder-tap request for one or more battery-constrained devices; storing the shoulder-tap request in a database; retrieving last known network session information for each of the one or more battery-constrained devices; calculating shoulder-tap beacon frequency for each of the one or more battery-constrained devices; creating a shoulder-tap beacon for each of the one or more battery-constrained devices; and sending the shoulder-tap beacon to the destination internet protocol (IP) address of each of the one or more battery-constrained devices in the calculated shoulder-tap beacon frequency.

In another embodiment, the system for delivering a shoulder-tap to one or more battery-constrained devices including an application server, front end application programming interface (API), a shoulder-tap server, a shoulder-tap database, a session database and one or more battery-constrained devices, wherein the shoulder-tap server receives a shoulder-tap request for one or more battery-constrained devices from an application serve; stores the shoulder-tap request in the shoulder-tap database; retrieves last known network session information for each of the one or more battery-constrained devices from the session database; calculates shoulder-tap beacon frequency for each of the one or more battery-constrained devices; creates a shoulder-tap beacon for each of the one or more battery-constrained devices; and sends the shoulder-tap beacon to the destination internet protocol (IP) address of each of the one or more battery-constrained devices in the calculated shoulder-tap beacon frequency.

In yet another embodiment, the non-transitory computer-readable medium for delivering a shoulder-tap to one or more battery-constrained devices having executable instructions stored therein that, when executed, cause one or more processors corresponding to a system having a storage database, a data processing system including a processor, a database and a user interface to perform operations including receiving a shoulder-tap request for one or more battery-constrained devices; storing the shoulder-tap request in a database; retrieving last known network session information for each of the one or more battery-constrained devices; calculating shoulder-tap beacon frequency for each of the one or more battery-constrained devices; creating a shoulder-tap beacon for each of the one or more battery-constrained devices; and sending the shoulder-tap beacon to the destination internet protocol (IP) address of one or more battery-constrained devices in the calculated shoulder-tap beacon frequency.

Further embodiments, forms, objects, features, advantages, aspects, and benefits of the present application shall become apparent from the detailed description and drawings included herein.

As used herein the terms device, IoT device, cellular IoT device, third party system, smart phone, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides a method, system and computer program product for delivering a shoulder-tap for battery-constrained devices in specific situations to improve the feasibility, reliability and economics of establishing communications as well as prioritizing shoulder-tap approaches for one or more preferred implementations. It will be understood by those skilled in the art that one or more shoulder-tap methods may be employed by the present invention and that the presence or absence of a shoulder-tap method presented herein is not indicative of any limitation to the present invention.

Figure 1:
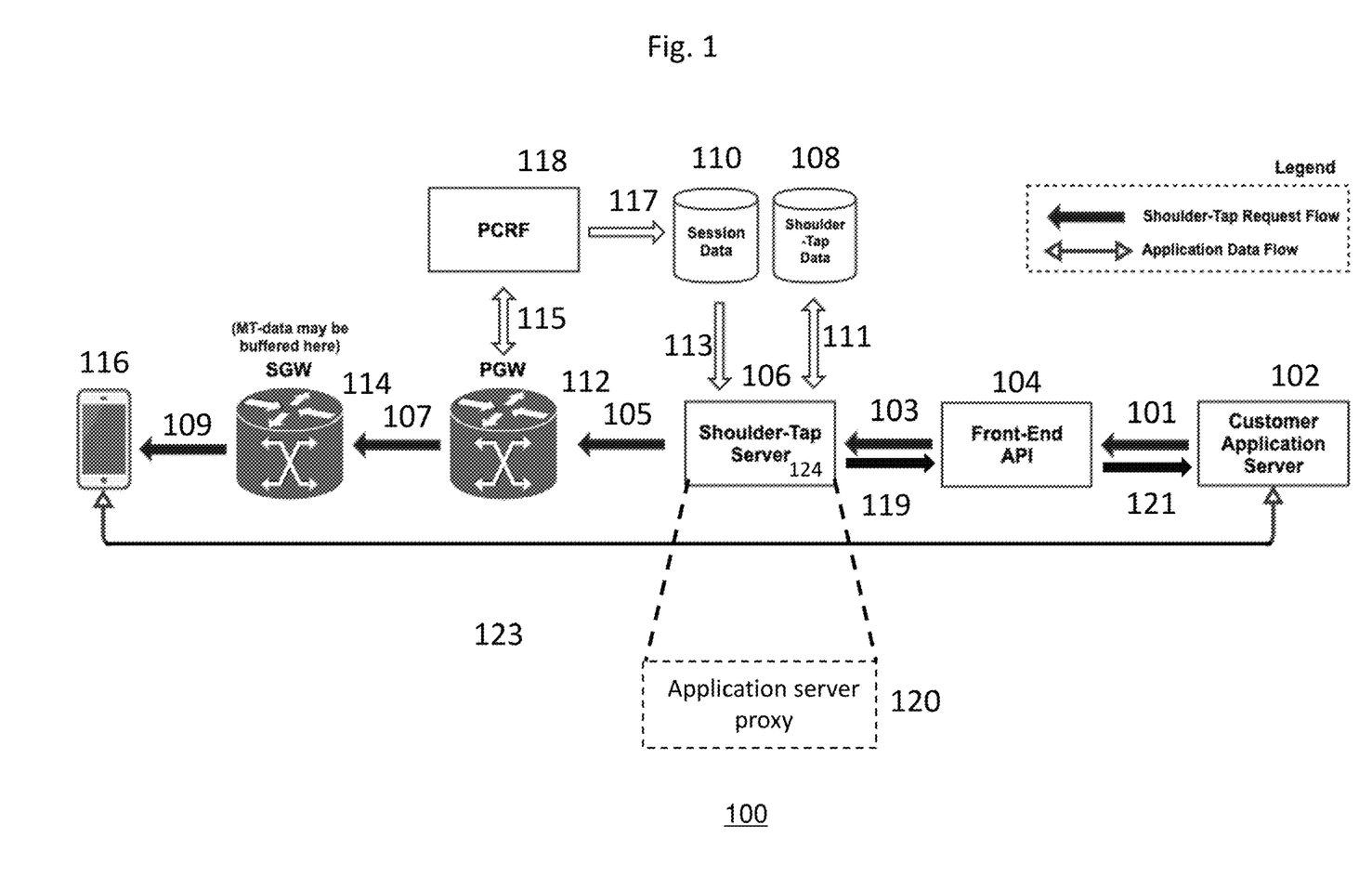
FIG. 1 illustrates a method and system 100 for delivering a shoulder-tap for battery-constrained devices according to one or more embodiments of the present invention.

FIG. 1 illustrates a method and system 100 for delivering a shoulder-tap for battery-constrained devices according to one or more embodiments of the present invention. In an embodiment, the method system 100 for delivering a shoulder-tap to battery-constrained devices includes: an application server 102, front end API 104, shoulder-tap server 106, a storage database called shoulder-tap database 108, a storage database called session database 110, packet data network gateway also known as PDN gateway (PGW) 112, serving gateway (SGW) 114, policy and charging rules function (PCRF) 118, a device 116. The battery-constrained device described herein may be an IoT device or a cellular IoT device, also known as user equipment (UE). Although the invention is described and illustrated herein using a single battery constrained device, it is equally applicable to more than one device and is within the scope of this application.

In an embodiment, the method for delivering a shoulder-tap to battery-constrained devices includes: receiving a shoulder-tap request via step 101, storing the shoulder-tap request in a database via step 111, retrieving the last known network session information including destination IP address of the battery-constrained device via step 113, calculating shoulder-tap beacon frequency for the battery-constrained device, creating a shoulder-tap beacon, and sending the shoulder-tap beacon (i.e. shoulder-tap payload packets with unique request identifier) to the destination IP address of the battery-constrained device in the calculated shoulder-tap beacon frequency.

The network session described herein may also be known as a PDU (Protocol Data Unit) session and is defined in 3GPP specification as an association between the UE (User equipment) and a data network that provides PDU connectivity service; a data session; a packet data session; a packet service session etc.

For example, the customer server ("application server") 102 sends a shoulder-tap request with validity period via step 101 to shoulder-tap server 106 via front-end API 104. The request may also optionally include unique identifier, also known as REQ-ID, that could be in the form of a timestamp, universally unique identifier (UUID), etc.

After receiving the shoulder-tap request, the shoulder-tap server 106 creates and assigns a unique identifier, also known as request identifier (REQ-ID) if not specified in the received request and stores the shoulder-tap request into database 108 via step 111. The shoulder-tap server then sends an acknowledgment message with the REQ-ID to the customer application server 102 via front end API 104 via steps 119 and 121. The shoulder-tap server also retrieves the latest session info, the IP address which is allocated for the device, also known as the destination IP address, serving mobility management entity/serving gateway (MME/SGW) info including their operational parameters (e.g. default 'down link (DL) packet buffering duration time', 'down link (DL) packet buffering suggested packet count'), and other information that will be used for calculating shoulder-tap beacon frequency for the device from the session database 110 via step 113.

The shoulder-tap server then calculates the shoulder-tap beacon frequency for the device in the target MME/SGW such that this beacon frequency is high enough so as to not miss delivery of the shoulder-tap beacon message to the device at least one time in a timely manner and creates a 'shoulder-tap payload with the received REQ-ID', also referred to herein as "shoulder-tap beacon" via step 124. The shoulder-tap server then sends the shoulder-tap payload packets to the destination IP address of the battery-constrained device via the packet data network gateway also known as PDN gateway (PGW) 112 via step 105 in the calculated shoulder-tap beacon frequency. The serving gateway (SGW) 114 may conduct "extended buffering" if necessary. The shoulder-tap server may repeat the steps 113, 124 and 105 above until notification of completion of the shoulder-tap request is received, the validity period of the shoulder-tap request expires, or the shoulder-tap request is cancelled.

When waking up from its power saving state, for example, power saving mode or extended idle mode discontinuous reception (DRX), the device tries to read a should-tap beacon message from pre-arranged port and, if available, checks if it's a new shoulder-tap request by comparing the received REQ-ID with the previous requests. If the device decides that the received shoulder-tap has already been processed, there is no further action taken, otherwise, the device responds with an acknowledgment that includes the REQ-ID to the application server, of which IP address/port can be either pre-arranged with the device in advance or provided as a part of the should-tap request as a "reach-back" address.

After receiving the shoulder-tap acknowledgment from the device 116, the application server 102 notifies the shoulder-tap server 106 via front-end API 104 of completion of the shoulder-tap request as identified with REQ-ID.

When the shoulder-tap server 106 gets notified of completion of the shoulder-tap request, expiration of the validity period of the shoulder-tap request, or cancellation of the shoulder-tap request, it removes the associated entry from the database 108 and stops sending the shoulder-tap beacon message(s) to the device.

Optionally, the shoulder-tap server 106 may take the role of application server proxy 120 and mediate the shoulder-tap traffic between the device 116 and the customer application server 102. The application server proxy 120 may be defined as a proxy server for application server for communication with the device 116 and the customer application server 102.

Once the device 116 is woken up using shoulder-tap, application data flow between the device 116 and the customer application server 102 starts as illustrated by arrow 123 between the device 116 and customer application server 102.

Note that the Policy and Charging Rule Function (PCRF) 118 communicates with the packet data network gateway also known as PDN gateway (PGW) 112 via step 115 and populates the session database 110 via step 117 with the session information/network session information that is collected from the packet data network gateway also known as PDN gateway (PGW) when the device 116 gets attached to the internet protocol (IP) network at the PGW 112.

It is assumed here that the session database 110 is equipped with the mobility management entity/serving gateway (MME/SGW) profiles which include associated operational parameters such as but not limited to default and minimum/maximum (min/max) range values of 'down link (DL) packet buffering duration time', 'down link (DL) packet buffering suggested packet count', and other information that will be used for calculating shoulder-tap beacon frequency.

Figure 2A:
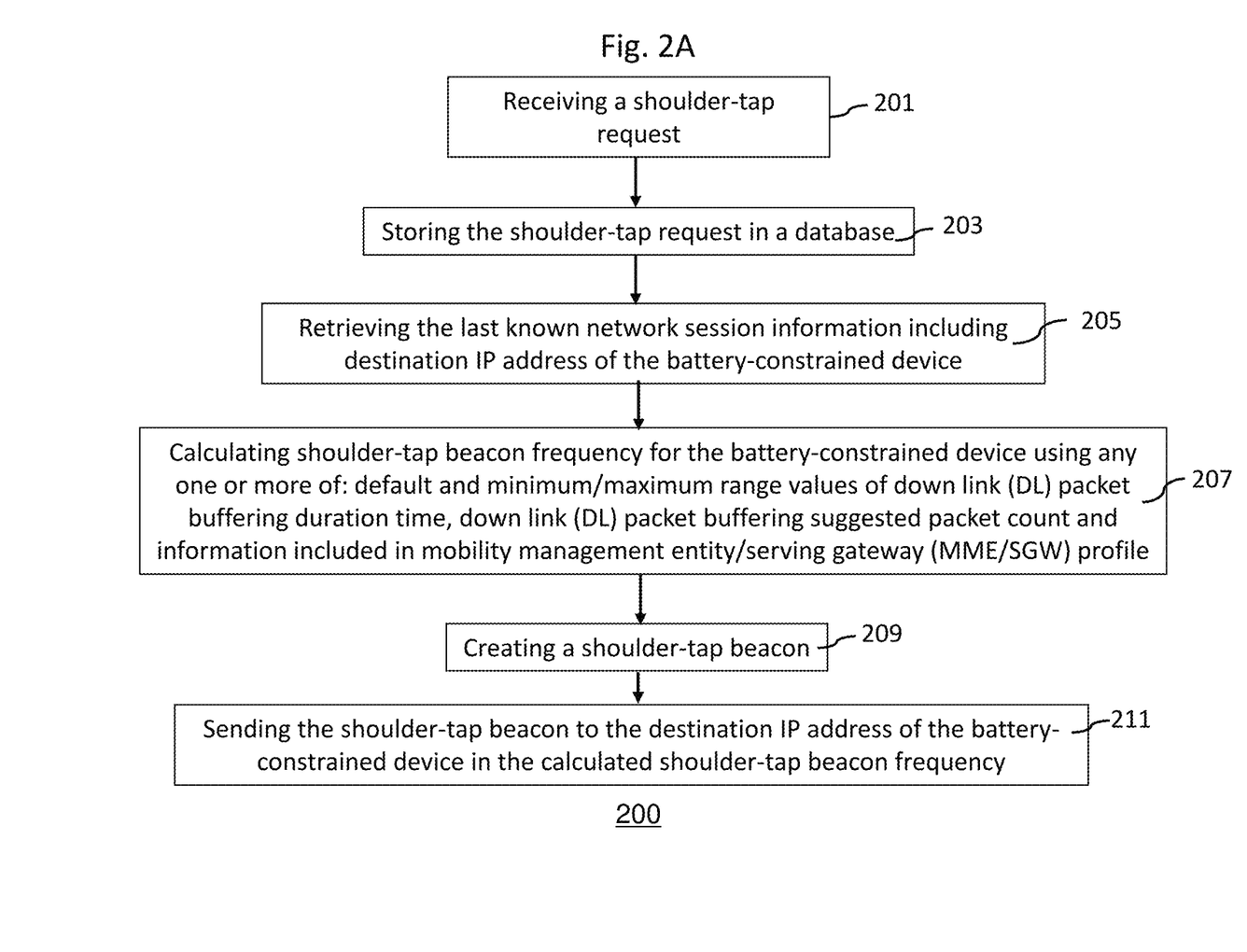
FIGS. 2A and 2B illustrate process flows 200 and 200' showing the method for delivering a shoulder-tap to battery-constrained devices according to one or more embodiments of the present invention.
Figure 2B:
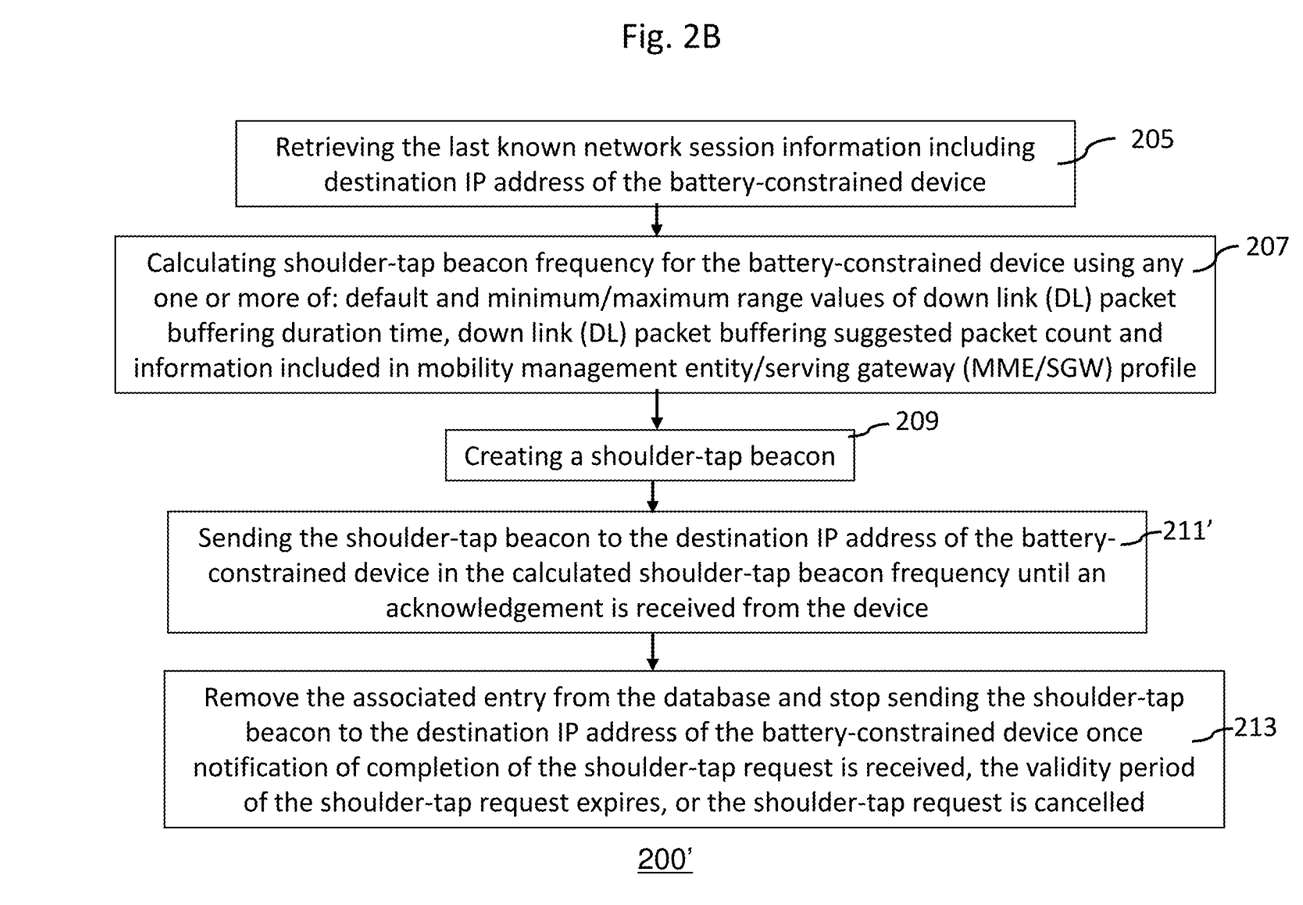

FIGS. 2A and 2B illustrate process flows 200 and 200' showing the method for delivering a shoulder-tap to battery-constrained devices according to one or more embodiments of the present invention. In an embodiment, the method includes receiving a shoulder-tap request via step 201, storing the shoulder-tap request in a database via step 203, retrieving the last known network session information including destination internet protocol (IP) address of the battery-constrained device via step 205, calculating shoulder-tap beacon frequency for the battery-constrained device via step 207, creating a shoulder-tap beacon via step 209, and sending the shoulder-tap beacon or shoulder-tap payload packets with unique request identifier to the destination internet protocol (IP) address of the battery-constrained device via step 211 in the calculated shoulder-tap beacon frequency via step 209. These steps are also illustrated in FIG. 1 and described in detail above in the description accompanying FIG. 1.

The battery-constrained device described herein may be an IoT device or a cellular IoT device etc. also known as user equipment (UE). Although the invention is described and illustrated herein using a single battery constrained device, it is equally applicable to more than one device and is within the scope of this application.

The network session described herein may also be known as a PDU (Protocol Data Unit) session and is defined in 3GPP specification as an association between the UE (User equipment) and a Data Network that provides PDU connectivity service; a data session; a packet data session; a packet service session etc.

For example, the customer server ("application server") sends a shoulder-tap request with validity period to shoulder-tap server via front-end API. The request may also optionally include a unique identifier ("REQ-ID") that could be in the form of timestamp, universally unique identifier (UUID), etc.

After receiving the shoulder-tap request via step 201, the shoulder-tap server creates and assigns a unique identifier, also known as request identifier (REQ-ID) if not specified in the received request and stores the shoulder-tap request into database via step 203. The shoulder-tap server then sends an acknowledgment message with the REQ-ID to the customer application server via front end API. The shoulder-tap server also retrieves the latest session info, the IP address which is allocated for the device, also known as the destination IP address, serving mobility management entity/serving gateway (MME/SGW) info including their operational parameters (e.g. default 'down link (DL) packet buffering duration time', 'down link (DL) packet buffering suggested packet count'), and other information that will be used for calculating shoulder-tap beacon frequency for the device from the session database via step 205.

The shoulder-tap server then calculates the shoulder-tap beacon frequency for the device in the target MME/SGW, such that the beacon frequency is high enough so as to not miss delivery of the shoulder-tap beacon message to the device at least one time in a timely manner via step 207 and creates a 'shoulder-tap payload with the received REQ-ID', also referred to herein as "shoulder-tap beacon" via step 209. The shoulder-tap server then sends the shoulder-tap payload packets to the destination IP address of the battery-constrained device via the packet data network gateway also known as PDN gateway (PGW) via step 211 in the calculated shoulder-tap beacon frequency. The serving gateway (SGW) may conduct "extended buffering" if necessary. The shoulder-tap server may repeat the steps 205, 207, 209 and 211 above as illustrated by steps 205, 207, 209, 211' of FIG. 2B until notification of completion of the shoulder-tap request is received, the validity period of the shoulder-tap request expires, or the shoulder-tap request is cancelled.

When waking up from its power saving state, for example, power saving mode or extended idle mode discontinuous reception (DRX), the device tries to read a should-tap beacon message from pre-arranged port and, if available, checks if it's a new shoulder-tap request by comparing the received REQ-ID with the previous requests. If the device decides that the received shoulder-tap has already been processed, there is no further action taken, otherwise, the device responds with an acknowledgment that includes the REQ-ID to the application server, of which IP address/port can be either pre-arranged with the device in advance or provided as a part of the should-tap request (e.g., as a "reach-back" address.)

After receiving the shoulder-tap acknowledgment from the device 116, the application server notifies the shoulder-tap server via front-end API of completion of the shoulder-tap request as identified with REQ-ID.

When the shoulder-tap server gets notified of completion of the shoulder-tap request, expiration of the validity period of the shoulder-tap request, or cancellation of the shoulder-tap request, it removes the associated entry from the database and stops sending the shoulder-tap beacon message(s) to the device as illustrated by step 213 of FIG. 2B.

Optionally, the shoulder-tap server 106 may take the role of application server proxy and mediate the shoulder-tap traffic between the device and the customer application server. The application server proxy may be defined as a proxy server for application server for communication with the device and the customer application server.

Once the device is woken up using shoulder-tap, application data flow between the device and the customer application server starts as illustrated by arrow between the device and customer application server.

Note that the Policy and Charging Rule Function (PCRF) communicates with the packet data network gateway also known as PDN gateway (PGW) via step and populates the session database with the session information/network session information that is collected from the packet data network gateway also known as PDN gateway (PGW) via step when the device gets attached to the internet protocol (IP) network at the PGW.

It is assumed here that the session database is equipped with the mobility management entity/serving gateway (MME/SGW) profiles which include associated operational parameters such as but not limited to default and minimum/maximum (min/max) range values of 'down link (DL) packet buffering duration time', 'down link (DL) packet buffering suggested packet count', and other information that will be used for calculating shoulder-tap beacon frequency.

Many other embodiments of the present invention are also envisioned. For example, in other embodiments, the present invention is directly applicable for kits and improvement configurations to existing universal serial bus (USB) devices.

As used herein, terms such as personal computers (PCs), systems, servers, stations, and similar terms are intended to be used interchangeably, without distinction or limitation. Such systems may include but not be limited to servers, server-based systems, multi-chipset systems, touch sensitive systems, assemblies, and devices therein, etc.

As used herein, the terms "remote", "peripheral", "device", and the like are intended to be used interchangeably but are not intended to be singular or necessarily specific to a particular connection technology such as being hardwired or wireless, but rather such terms are used with the understanding that the terms of interest are in or capable of being in operative communication with a system of the present invention.

Figure 3:
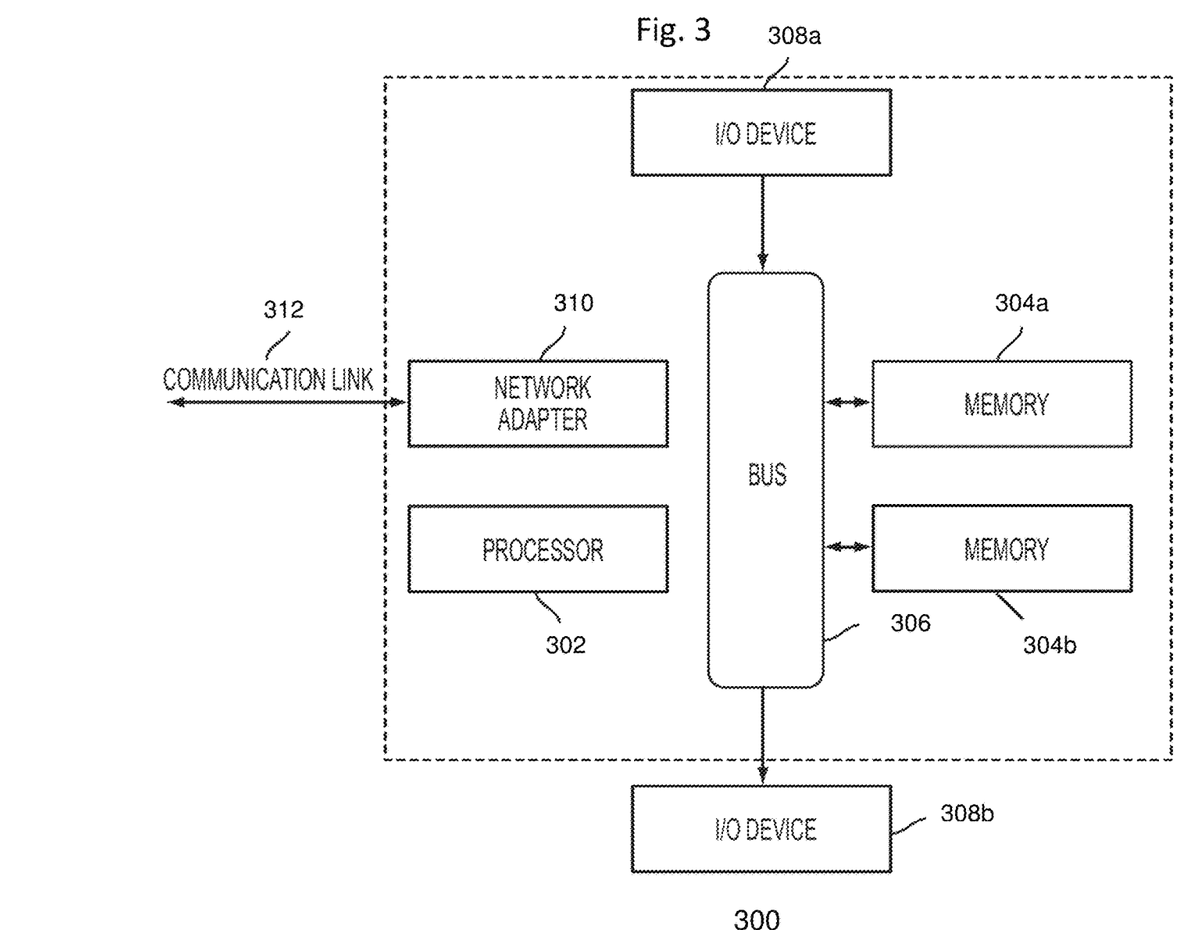
FIG. 3 illustrates a data processing system 300 suitable for storing the computer program product and/or executing program code in accordance with one or more embodiments of the present invention.

FIG. 3 illustrates a data processing system 300 suitable for storing the computer program product and/or executing program code in accordance with one or more embodiments of the present invention. The data processing system 300 includes a processor 302 coupled to memory elements 304a-b through a system bus 306. In an embodiment, the data processing system 300 may include more than one processor and each processor may be coupled directly or indirectly to one or more memory elements through a system bus.

Memory elements 304a-b can include local memory employed during actual execution of the program code, bulk storage, and cache memories that provide temporary storage of at least some program code in order to reduce the number of times the code must be retrieved from bulk storage during execution. As shown, input/output or I/O devices 308a-b (including, but not limited to, keyboards, displays, pointing devices, etc.) are coupled to the data processing system 300. I/O devices 308a-b may be coupled to the data processing system 300 directly or indirectly through intervening I/O controllers (not shown).

In FIG. 3, a network adapter 310 is coupled to the data processing system 302 to enable data processing system 302 to become coupled to other data processing systems or remote printers or storage devices through communication link 312. Communication link 312 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include digital versatile disk (DVD), compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for delivering a shoulder-tap to one or more battery-constrained devices comprising:
   receiving a shoulder-tap request for one or more battery-constrained devices;
   storing the shoulder-tap request in a database;
   retrieving last known network session information for each of the one or more battery-constrained devices;
   dynamically calculating frequency of sending shoulder-tap beacon for each of the one or more battery-constrained devices, wherein the frequency is calculated to factor in listen window size between sleeps and wake up duration time of each of the one or more battery-constrained devices;
creating a shoulder-tap beacon for each of the one or more battery-constrained devices; and
sending the shoulder-tap beacon to the destination internet protocol (IP) address for each of the one or more battery-constrained devices in the calculated shoulder-tap beacon frequency.

2. The method of claim 1, wherein the one or more battery-constrained devices comprise Internet of Thigs (IoT) devices.

3. The method of claim 1, wherein the shoulder-tap request includes a unique request identifier (REQ-ID), wherein the unique request identifier comprises a timestamp, a universally unique identifier (UUID), or a combination thereof.

4. The method of claim 1, wherein the shoulder-tap beacon comprises a shoulder-tap payload with the received REQ-ID.

5. The method of claim 1, wherein calculating frequency of sending shoulder-tap beacon for the one or more battery-constrained devices comprises using any one or more of: default and minimum/maximum range values of down link (DL) packet buffering duration time, down link (DL) packet buffering suggested packet count and information included in mobility management entity/serving gateway (MME/SGW) profile.

6. The method of claim 1, wherein the shoulder-tap beacon frequency is such that the shoulder-tap beacon message is delivered to the one or more battery-constrained devices at least once in a timely manner.

7. The method of claim 1 further includes sending the shoulder-tap beacon over and over in a more optimized frequency to the destination IP address until an acknowledgement is received from the one or more battery-constrained devices to which the shoulder-tap beacon was sent.

8. The method of claim 7 further includes removing associated entry from a shoulder-tap database and stop sending the shoulder-tap beacon message to the one or more battery-constrained devices once the acknowledgement is received from the one or more battery-constrained devices.

9. The method of claim 1 further includes starting application data flow between the one or more battery-constrained devices and customer application server once the one or more battery-constrained devices, to which the shoulder-tap beacon was sent, wake up.

10. A system for delivering a shoulder-tap to one or more battery-constrained devices comprising an application server, front end application programming interface (API), a shoulder-tap server, a shoulder-tap database, a session database and one or more battery-constrained devices, wherein the shoulder-tap server
receives a shoulder-tap request for one or more battery constrained devices from the application server;
stores the shoulder-tap request in the shoulder-tap database;
retrieves last known network session information from the session database for each of the one or more battery-constrained devices;
dynamically calculates frequency of sending shoulder-tap beacon for each of the one or more battery-constrained devices,
wherein the frequency is calculated to factor in listen window size between sleeps and wake up duration time of each of the one or more battery-constrained devices;
creates a shoulder-tap beacon for each of the one or more battery-constrained devices; and
sends the shoulder-tap beacon to the destination internet protocol (IP) address of each of the one or more battery-constrained devices in the calculated shoulder-tap beacon frequency.

11. The system of claim 10, wherein the one or more battery-constrained devices comprise Internet of Thigs (IoT) devices.

12. The system of claim 10, wherein the shoulder-tap request includes a unique request identifier (REQ-ID), wherein the unique request identifier comprises a timestamp, a universally unique identifier (UUID), or a combination thereof.

13. The system of claim 10, wherein the shoulder-tap beacon comprises a shoulder-tap payload with the received REQ-ID.

14. The system of claim 10, wherein calculating frequency of sending shoulder-tap beacon for the one or more battery-constrained devices comprises using any one or more of: default and minimum/maximum range values of down link (DL) packet buffering duration time, down link (DL) packet buffering suggested packet count and information included in mobility management entity/serving gateway (MME/SGW) profile.

15. The system of claim 10, wherein the shoulder-tap beacon frequency is such that the shoulder-tap beacon message is delivered to the one or more battery-constrained devices at least once in a timely manner.

16. The system of claim 10, wherein the shoulder-tap server sends the shoulder-tap beacon over and over in a more optimized frequency to the destination IP address until an acknowledgement is received from the one or more battery-constrained devices to which the shoulder-tap beacon was sent.

17. The system of claim 16, wherein the shoulder-tap server removes associated entry from the shoulder-tap database and stops sending the shoulder-tap beacon message to the one or more battery-constrained devices once the acknowledgement is received from the one or more battery-constrained devices to which the shoulder-tap beacon was sent.

18. The system of claim 10, wherein application data flow between the one or more battery-constrained devices and customer application server begins once the one or more battery-constrained devices, to which the shoulder-tap beacon was sent, wake up.

19. A non-transitory computer-readable medium for delivering a shoulder-tap to one or more battery-constrained devices having executable instructions stored therein that, when executed, cause one or more processors corresponding to a system having a storage database, a data processing system including a processor, a database and a user interface to perform operations comprising:
receiving a shoulder-tap request for one or more battery-constrained devices;
storing the shoulder-tap request in a database;
retrieving last known network session information for each of the one or more battery-constrained devices;
dynamically calculating frequency of sending shoulder-tap beacon for each of the one or more battery-constrained devices,
wherein the frequency is calculated to factor in listen window size between sleeps and wake up duration time of each of the one or more battery-constrained devices;
creating a shoulder-tap beacon for each of the one or more battery-constrained devices; and sending the shoulder-tap beacon to the destination internet protocol (IP) address for each of the one or more battery-constrained devices in the calculated shoulder-tap beacon frequency.

20. The non-transitory computer-readable medium of claim 19, wherein the one or more battery-constrained devices comprise Internet of Thigs (IoT) devices.

21. The non-transitory computer-readable medium of claim 19, wherein the shoulder-tap request includes a unique request identifier (REQ-ID), wherein the unique request identifier comprises a timestamp, a universally unique identifier (UUID), or a combination thereof.

22. The non-transitory computer-readable medium of claim 19, wherein the shoulder-tap beacon comprises a shoulder-tap payload with the received REQ-ID.

23. The non-transitory computer-readable medium of claim 19, wherein calculating frequency of sending shoulder-tap beacon for the battery-constrained device comprises using any one or more of: default and minimum/maximum range values of down link (DL) packet buffering duration time, down link (DL) packet buffering suggested packet count and information included in mobility management entity/serving gateway (MME/SGW) profile.

24. The non-transitory computer-readable medium of claim 19, wherein the shoulder-tap beacon frequency is such that the shoulder-tap beacon message is delivered to the one or more battery-constrained devices at least once in a timely manner.

25. The non-transitory computer-readable medium of claim 19, wherein the operations further include sending the shoulder-tap beacon over and over in a more optimized frequency to the destination IP address of the one or more battery-constrained devices until an acknowledgement is received from the one or more battery-constrained devices to which the shoulder-tap beacon was sent.

26. The non-transitory computer-readable medium of claim 25, wherein the operations further include removing associated entry from a shoulder-tap database and stop sending the shoulder-tap beacon message to the one or more battery-constrained devices once the acknowledgement is received from the one or more battery-constrained devices to which the shoulder-tap beacon was sent.

27. The non-transitory computer-readable medium of claim 19, wherein the operations further include starting application data flow between the battery-constrained device and customer application server once the one or more battery-constrained devices, to which the shoulder-tap beacon was sent, wake up.

* * * * *